US012330415B2

(12) United States Patent
Kondo

(10) Patent No.: US 12,330,415 B2
(45) Date of Patent: Jun. 17, 2025

(54) LIQUID DROPLET EJECTING APPARATUS

(71) Applicant: BROTHER KOGYO KABUSHIKI KAISHA, Nagoya (JP)

(72) Inventor: Hirofumi Kondo, Mie (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 352 days.

(21) Appl. No.: 18/168,695

(22) Filed: Feb. 14, 2023

(65) Prior Publication Data

US 2023/0311480 A1 Oct. 5, 2023

(30) Foreign Application Priority Data

Apr. 1, 2022 (JP) ................................ 2022-061641

(51) Int. Cl.
*B41J 3/407* (2006.01)
*B41J 2/045* (2006.01)

(52) U.S. Cl.
CPC ................................ *B41J 2/04501* (2013.01)

(58) Field of Classification Search
CPC ...................... B41J 2203/01; B41J 2203/011; B41J 3/4073; B41J 3/40733
See application file for complete search history.

(56) References Cited

U.S. PATENT DOCUMENTS

2014/0112695 A1* 4/2014 van Dijk .................. B41J 11/66 400/621
2016/0136949 A1* 5/2016 Kojima ................ B41J 2/04503 347/8

FOREIGN PATENT DOCUMENTS

JP 2020104472 A * 7/2020

OTHER PUBLICATIONS

Matsura, MachineTranslationofJP-2020104472-A, 2020 (Year: 2020)*

* cited by examiner

*Primary Examiner* — Scott A Richmond
(74) *Attorney, Agent, or Firm* — Merchant & Gould P.C.

(57) ABSTRACT

A liquid droplet ejecting apparatus, includes: an ejecting head having an ejecting surface, the ejecting head being configured to eject liquid droplets onto a print target based on image data, the print target including a parallel surface and an inclined surface; a distance detector which detects a distance between the ejecting surface and the parallel surface and a distance between the ejecting surface and the inclined surface; and a controller. If the controller determines that the liquid droplets are to be ejected onto the inclined surface based on a detection result of the distance detector, the controller obtains information about a print mode selected by a user from a plurality of print modes related to ejection control of the liquid droplets for the inclined surface; and executes an ejection control of the liquid droplets to the inclined surface based on the print mode selected by the user.

19 Claims, 11 Drawing Sheets

LIQUID DROPLET EJECTING APPARATUS

REFERENCE TO RELATED APPLICATIONS

This application claims priority from Japanese Patent Application No. 2022-061641 filed on Apr. 1, 2022. The entire content of the priority application is incorporated herein by reference.

BACKGROUND ART

There is known a liquid droplet ejecting apparatus for ejecting liquid droplets onto a print medium. In addition to a printing paper, three-dimensional objects such as a mug and a phone case are used as the print medium. Such three-dimensional objects may have inclined surfaces. When a distance between an ejecting surface of an ejecting head and the print medium changes, landing positions of the liquid droplets will be displaced according to the distance. This causes a printed image to be stretched out in a part of the print medium.

Therefore, when forming an image on an inclined surface, a dimension of the image corresponding to the inclined surface is reduced in the image data.

DESCRIPTION

However, even when the image is printed on the inclined surface of the three-dimensional object by the method described above, the image appears shrunken when viewed from a direction perpendicular to the ejecting surface.

Therefore, an object of the present teaching is to provide a liquid droplet ejecting apparatus capable of forming an image that appears as desired by the user.

According to an aspect of the present teaching, there is provided a liquid droplet ejecting apparatus, including: an ejecting head having an ejecting surface, the ejecting head being configured to eject liquid droplets onto a print target based on image data, the print target including a parallel surface parallel to the ejecting surface and an inclined surface inclined with respect to the ejecting surface; a distance detector configured to detect a distance between the ejecting surface and the parallel surface and a distance between the ejecting surface and the inclined surface; and a controller, wherein if the controller determines that the liquid droplets are to be ejected onto the inclined surface based on a detection result of the distance detector, the controller is configured to: obtain information about a print mode selected by a user from a plurality of print modes related to ejection control of the liquid droplets to the inclined surface; and execute an ejection control of the liquid droplets for the inclined surface based on the print mode selected by the user.

According to the present teaching, the liquid droplets are ejected onto the inclined surface based on the print mode selected by the user. Therefore, it is possible to form an image that appears as desired by the user on the inclined surface.

A liquid droplet ejecting apparatus according to an embodiment of the present teaching will be explained below with reference to the drawings. The liquid droplet ejecting apparatus explained below is merely an embodiment of the present teaching. Therefore, the present teaching is not limited to the embodiment described below. It is possible to make addition, deletion, and change within a range without deviating from the gist or essential characteristics of the present teaching.

Figure 1:
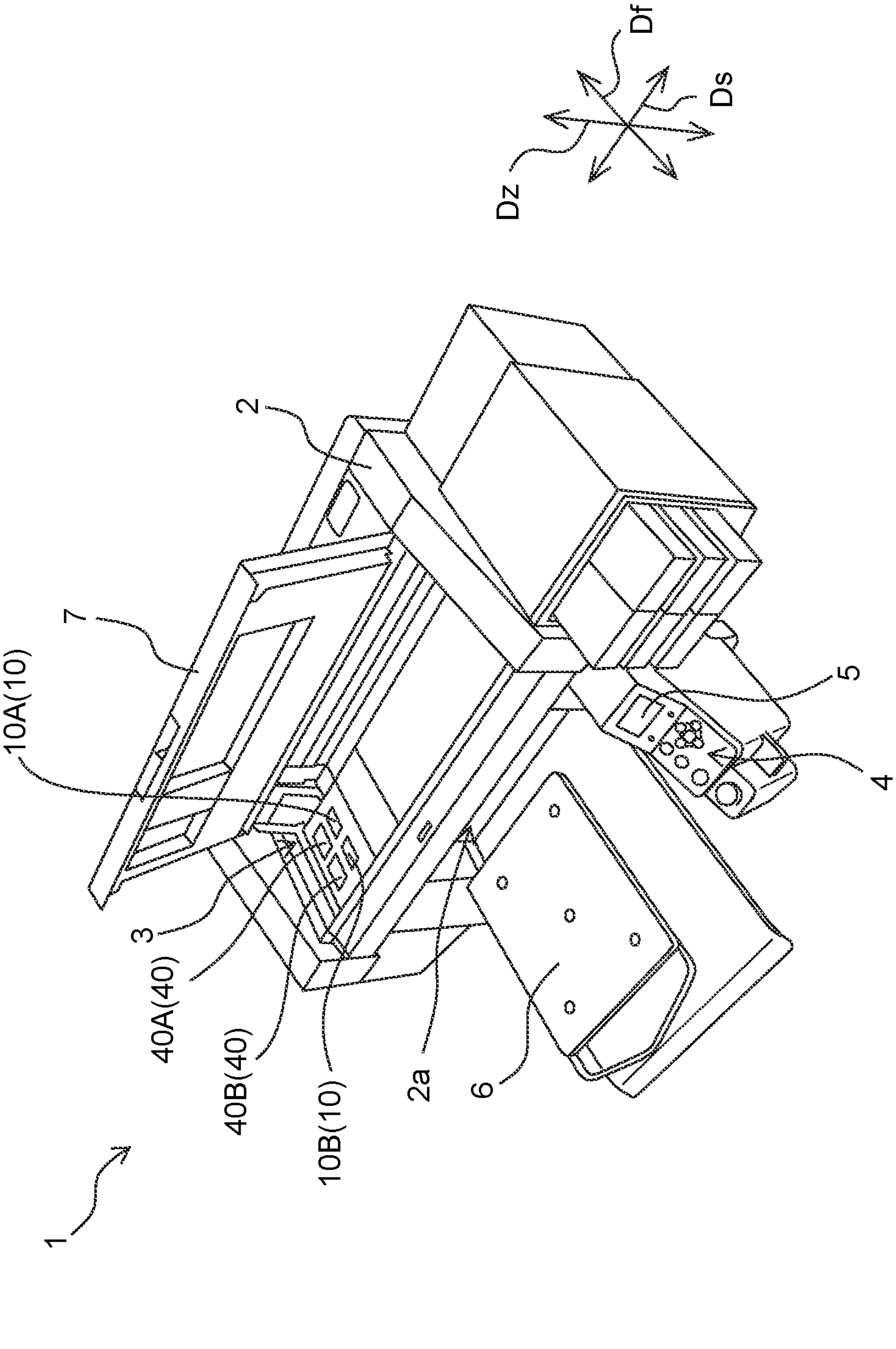
FIG. 1 is a perspective view of an image forming apparatus in which a liquid droplet ejecting apparatus according to an embodiment of the present teaching is installed.

FIG. 1 is a perspective view of an image forming apparatus 1 in which the liquid droplet ejecting apparatus 1_a_ of the embodiment of the present teaching is installed. In FIG. 1, mutually orthogonal directions are defined as a first direction Ds, a second direction Df, and a third direction Dz. In this embodiment, for example, the first direction Ds is a movement direction of a carriage 3, the second direction Df is a conveyance direction of a printing medium W as a print target, and the third direction Dz is an up-down direction. In the following explanation, Ds is referred to as the movement direction and Df is referred to as the conveyance direction.

As depicted in FIG. 1, the image forming apparatus 1 in this embodiment includes a housing 2, operation keys 4, a display 5, a platen 6 on which the printing medium W is placed, and a top cover 7. The platen 6 corresponds to a conveying unit. The image forming apparatus 1 is also provided with the liquid droplet ejecting apparatus 1_a_ depicted in FIG. 2. The liquid droplet ejecting apparatus 1_a_ has an ejecting head 10 and a control unit 19 including a controller 20 (see FIG. 4). The ejecting head 10 is an inkjet head that ejects, for example, ultraviolet-curable type ink droplets as liquid droplets.

The housing 2 has a box shape. The housing 2 has an opening 2_a_. The housing 2 is provided with the operation keys 4. The display 5 is provided near the operation keys 4. The operation keys 4 accept operation inputs by a user. The display 5 is configured with a touch panel, for example, and displays predetermined information. A portion of the display 5 also functions as operation keys. The control unit 19 realizes printing functions based on inputs from the operation keys 4 or external inputs via an undepicted communication interface. The control unit 19 also controls display on the display 5.

The printing medium W is placed on the platen 6. The platen 6 has a predetermined thickness. The platen 6 is configured, for example, with a rectangular plate having the conveyance direction Df as its longitudinal direction. The platen 6 is removably supported by an undepicted platen support stand. The platen support stand is configured to move in the conveyance direction Df between a printing position where printing on the printing medium W is executed and a removal position where the printing medium W is removed from the platen 6, by a conveyance motor 33 (see FIG. 4). As a result, the platen 6 moves an ejection target surface of the printing medium W relative to the ejecting head 10 in the conveyance direction Df During the printing, the platen 6 moves in the conveyance direction Df, so that the printing medium W placed on the platen 6 is conveyed along the conveyance direction Df.

The top cover 7 is configured to rotate upward when an end of the top cover 7 is lifted. This exposes an interior of the housing 2.

Figure 2:
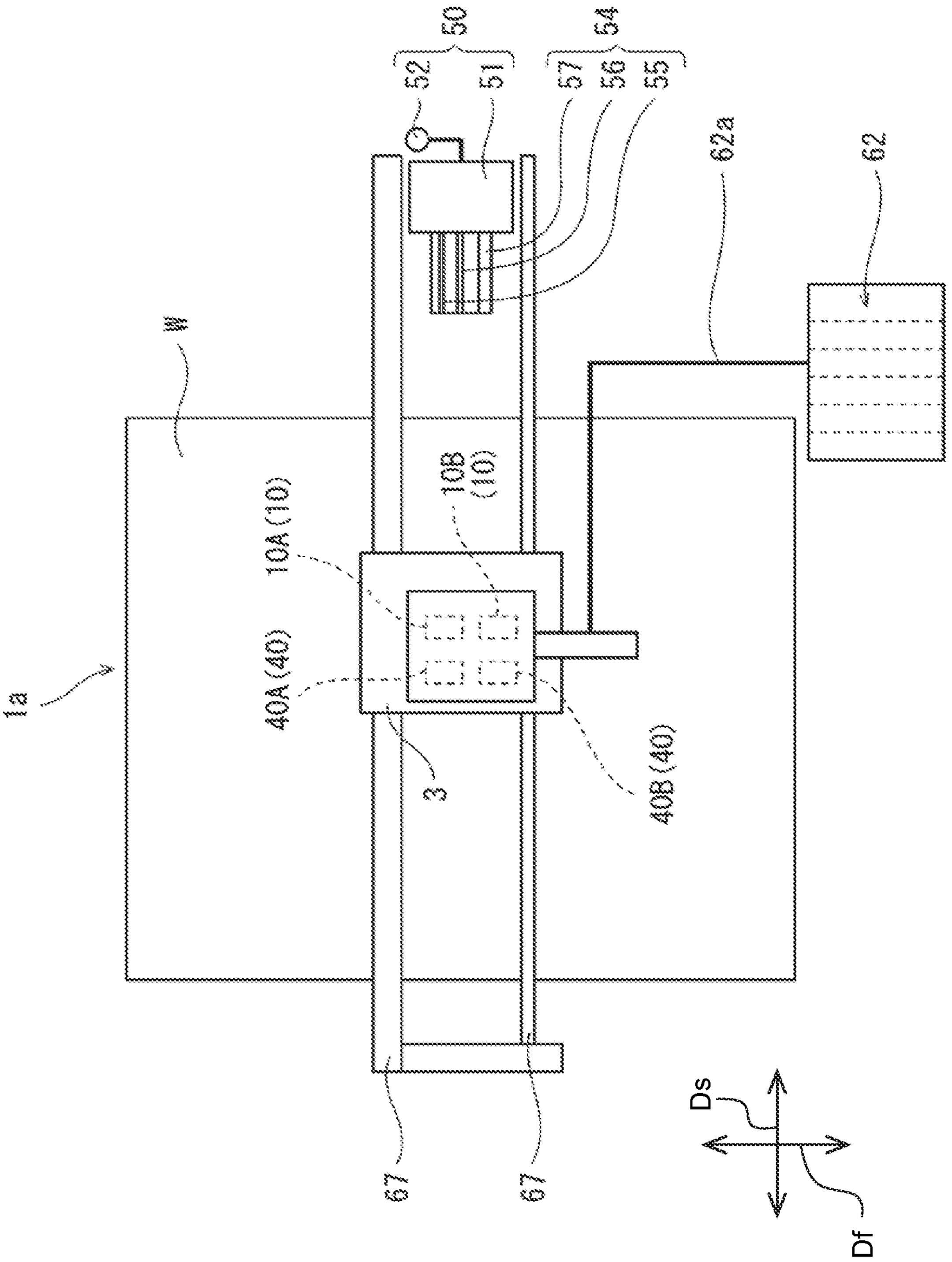
FIG. 2 is a plan view depicting the liquid droplet ejecting apparatus according to the embodiment of the present teaching.

As depicted in FIG. 2, the liquid droplet ejecting apparatus 1A has storage tanks 62, the carriage 3, and a pair of guide rails 67. The carriage 3 carries, for example, two ejecting heads 10 (10A, 10B) and two ultraviolet ray irradiation apparatuses 40 (40A, 40B). One ejecting head 10 and one ultraviolet ray irradiation apparatus 40 may be mounted on the carriage 3.

The carriage 3 is supported by the pair of guide rails 67 extending in the movement direction Ds and reciprocates along the guide rails 67 in the movement direction Ds. Accordingly, the two ejecting heads 10 (10A, 10B) and the two ultraviolet ray irradiation apparatuses 40 (40A, 40B) reciprocate in the movement direction Ds. The ejecting heads 10 are connected to the storage tanks 62 via tubes 62A.

In this embodiment, for example, the ejecting head 10A ejects ink droplets of each of the colors yellow (Y), magenta (M), cyan (C), and black (K), which are sometimes collectively referred to as color inks. When the ink droplets of these four colors are ejected onto the printing medium W, a color image is printed on the printing medium W. On the other hand, the ejecting head 10B ejects white (W) ink droplets and clear (Cr) ink droplets. When printing the color image on a woven fabric, for example, as the printing medium W, the ink droplets of white ink are ejected first as a base ink to reduce the effect on the color and material of the fabric, and then the ink droplets of the color inks are ejected over the white ink droplets. The clear ink droplets are ejected to add gloss or to protect the printing area.

Each of the storage tanks 62 stores ink. The storage tanks 62 are provided for each type of ink. For example, six storage tanks 62 are provided to store black, yellow, cyan, magenta, white, and clear inks, respectively.

The liquid droplet ejecting apparatus 1*a* is further provided with a purge unit 50 and a wipe unit 54. The purge unit 50 and the wipe unit 54 are positioned inside the pair of guide rails 67. The purge unit 50 and the wipe unit 54 are positioned on one end side of the pair of guide rails 67 in the movement direction Ds to overlap with a movement area of the carriage 3.

Figure 3:
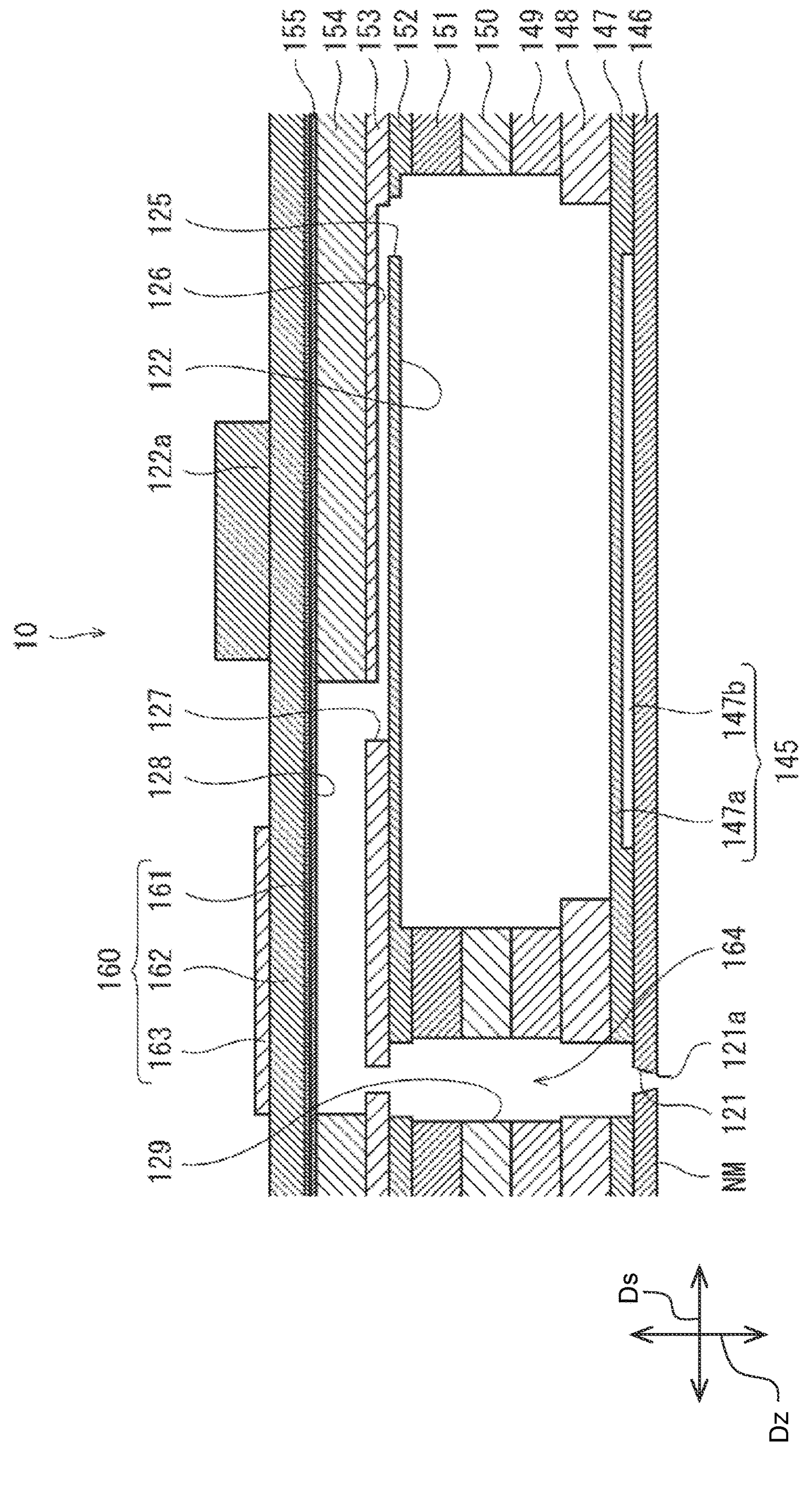
FIG. 3 is a cross sectional view depicting an ejecting head of FIG. 1.

The purge unit 50 has a cap 51, a suction pump 52, and an ascending/descending mechanism 53. The suction pump 52 is connected to the cap 51. The ascending/descending mechanism 53 raises and lowers the cap 51 between a suction position and a standby position. In the standby position, the ejecting surface NM (see FIG. 3) of the ejecting head 10 is separated from the cap 51. On the other hand, in the suction position, the ejecting surface NM of the ejecting head 10 is covered by the cap 51 to form a sealed space. When the suction pump 52 is driven while the cap 51 is positioned in the suction position, the sealed space is depressurized and the ink is discharged from nozzle holes 121*a* (see FIG. 3) as described below. (Purging process)

The wipe unit 54 has two wipers 55, 56 and a moving mechanism 57. The two wipers 55, 56 are supported by the moving mechanism 57. The moving mechanism 57 moves in the movement direction Df with the ejecting surface NM of the ejecting head 10 positioned to face the wipers 55, 56. As a result, the two wipers 55, 56 perform a wiping operation (i.e., wipe the ejecting surface NM) while moving in the movement direction Df.

A detailed structure of the ejecting head 10 is described next. The ejecting head 10 has a plurality of nozzles 121. The inks supplied from the storage tanks 62 are ejected as the ink droplets from the nozzles 121. The ejecting head 10 is a laminated body with a channel forming body and a volume changing unit. Ink channels are formed inside the channel forming body. A plurality of nozzle holes 121*a* are opened on the ejecting surface NM, which is a lower surface of the channel forming body. The volume changing unit is driven to change the volumes of the ink channels. In the nozzle holes 121*a*, meniscuses are vibrated and the ink is ejected.

The channel forming body of the ejecting head 10 is a laminated body of a plurality of plates. The volume changing unit includes a vibration plate 155 and actuators (piezoelectric elements) 160. A common electrode 161, described below, is formed on the vibration plate 155.

The channel forming body is formed by laminating, from the bottom, a nozzle plate 146, a spacer plate 147, a first channel plate 148, a second channel plate 149, a third channel plate 150, a fourth channel plate 151, a fifth channel plate 152, a sixth channel plate 153, and a seventh channel plate 154.

Each plate has holes and grooves of various sizes. The holes and grooves are combined inside the channel forming body formed by laminating the plates to form a plurality of nozzles 121, a plurality of individual channels 164, and a manifold 122 as ink channels.

The nozzles 121 are formed through the nozzle plate 146 in a stacking direction. A nozzle row is formed on the ejecting surface NM of the nozzle plate 146 by a plurality of nozzle holes 121*a* aligned in the conveyance direction Df.

The manifold 122 supplies the ink to a pressure chamber 128 to which ejection pressure is applied. The manifold 122 extends in the conveyance direction Df and is connected to one end of each of the individual channels 164. In other words, the manifold 122 functions as a common flow passage for the ink. The manifold 122 is formed of through holes through the first channel plate 148 to the fourth channel plate 151 in the stacking direction and a depression from the bottom surface of the fifth channel plate 152 overlapping in the stacking direction.

The nozzle plate 146 is located below the spacer plate 147. The spacer plate 147 is formed of stainless steel, for example. A concave portion 145 is formed in the spacer plate 147, for example, by half etching. The concave portion 145 is recessed in the thickness direction of the spacer plate 147 from a surface on a side of the nozzle plate 146. The concave portion 145 has a thin-walled portion forming a damper portion 147*a* and a damper space 147*b*. This forms the damper space 147*b* as a buffer space between the manifold 122 and the nozzle plate 146.

A supply port 122*a* is communicated to the manifold 122. The supply port 122*a* is formed in a cylindrical shape, for example, and is provided at one end in the conveyance direction Df of the manifold 122. The manifold 122 and the supply port 122*a* are connected by an undepicted channel.

Each of the individual channels 164 is connected to the manifold 122. Each individual channel 164 has an upstream end connected to the manifold 122 and a downstream end connected to a base of the nozzle 121. Each individual channel 164 is composed of a first communication hole 125, a supply throttle passage 126 which is an individual throttle passage, a second communication hole 127, the pressure chamber 128, and a descender 129, which are connected in this order.

A lower end of the first communication hole 125 is connected to an upper end of the manifold 122. The first communication hole 25 extends from the manifold 122 upward in the stacking direction and penetrates an upper portion in the fifth channel plate 152 in the stacking direction.

An upstream end of the supply throttle passage 126 is connected to an upper end of the first communication hole 125. The supply throttle passage 126 is formed by half etching, for example, and is formed by a groove depressed from a bottom surface of the sixth channel plate 153. An upstream end of the second communication hole 127 is connected to a downstream end of the supply throttle passage 126. The second communication hole 27 extends from the supply throttle passage 126 upward in the stacking direction and is formed through the sixth channel plate 153 in the stacking direction.

An upstream end of the pressure chamber 128 is connected to a downstream end of the second communication hole 127. The pressure chamber 128 is formed through the seventh channel plate 154 in the stacking direction.

The descender 129 is formed through the spacer plate 147, the first channel plate 148, the second channel plate 149, the third channel plate 150, the fourth channel plate 151, the fifth channel plate 152, and the sixth channel plate 153 in the stacking direction. An upstream end of descender 129 is connected to the downstream end of the pressure chamber 128, and the downstream end of the descender 129 is connected to the base end of the nozzle 121. The nozzle 121 overlaps with the descender 129 in the stacking direction, for example, and is positioned in the center of the descender 129 in a width direction.

The vibration plate 155 is stacked on top of the seventh channel plate 154 and covers upper end openings of the pressure chambers 128.

The actuator 160 includes a common electrode 161, a piezoelectric layer 162, and individual electrode 163, which are arranged in this order from below. The common electrode 161 covers an entire surface of the vibration plate 155. The piezoelectric layer 162 covers an entire surface of the common electrode 161. The individual electrode 163 is provided for each of the 128 pressure chambers and is arranged on the piezoelectric layer 162. One actuator 160 is composed of one individual electrode 163, the common electrode 161, and a portion of the piezoelectric layer 162 sandwiched between the individual electrode 163 and the common electrode 161.

The individual electrode 163 is electrically connected to a driver IC. The driver IC receives a control signal from the controller 20, generates a drive signal (voltage signal), and applies the drive signal to the individual electrode 163. In contrast, the common electrode 161 is always held at ground potential. In this configuration, an active part of the piezoelectric layer 162 expands and contracts in a planer direction together with the common electrode 161 and the individual electrode 163 in response to the drive signal. In response, the vibration plate 155 deforms in a direction of increasing and decreasing a volume of the pressure chamber 128. As a result, the ejection pressure is applied to the ink in the pressure chamber 128 to eject the ink droplets from the nozzle 121.

In the ejecting head 10, the ink flows into the manifold 122 via the supply port 122*a* and from the manifold 122 into the supply throttle passage 126 via the first communication hole 125. Further, the ink flows from the supply throttle passage 126 into the pressure chamber 128 via the second communication hole 127. The ink then flows through the descender 129 and into nozzle 121. Here, when the ejection pressure is applied to the pressure chamber 128 by the actuator 160, ink droplets are ejected from the nozzle holes 121*a*.

Figure 4:
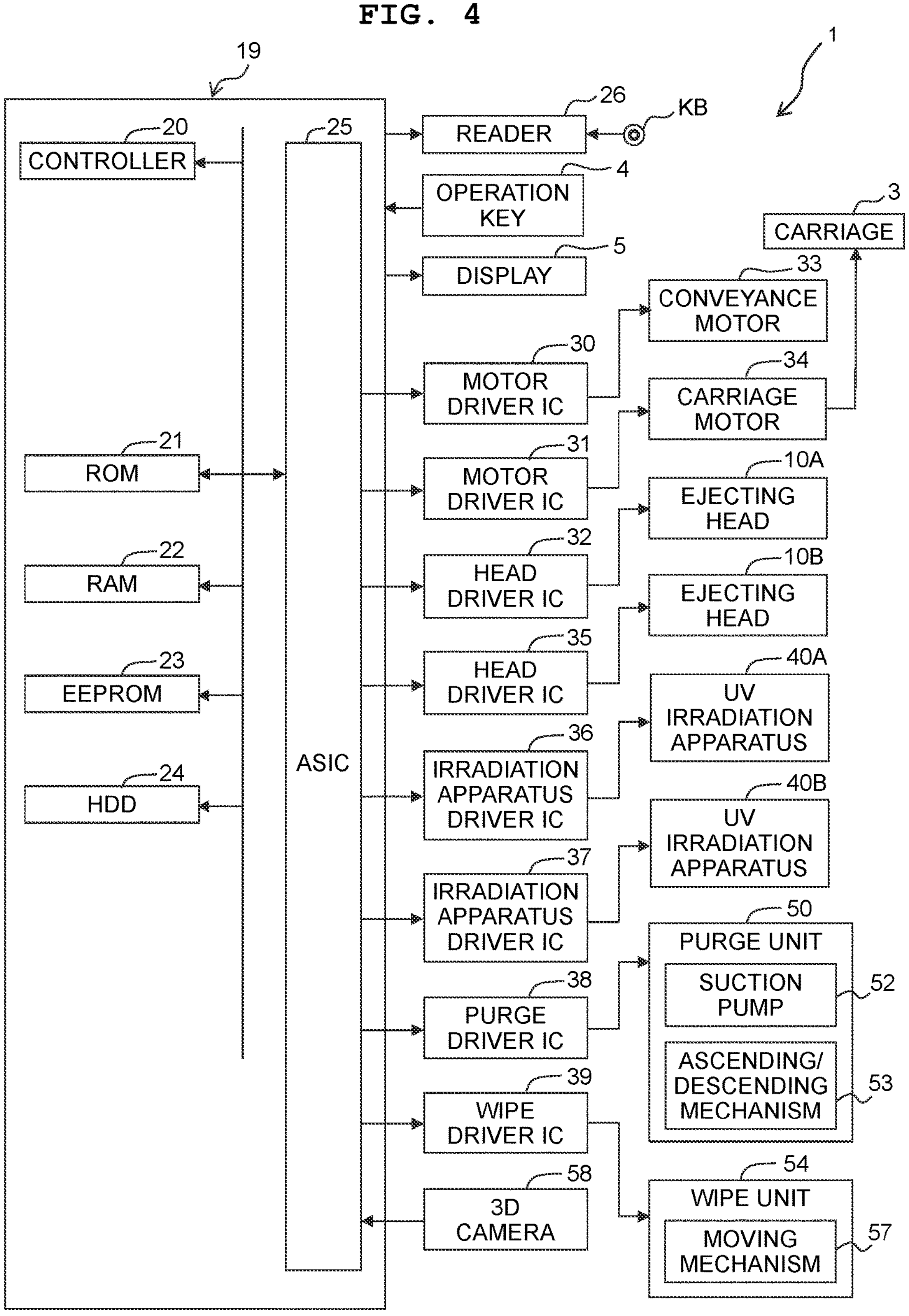
FIG. 4 is a block diagram depicting components of the image forming apparatus of FIG. 1.

As depicted in FIG. 4, the image forming apparatus 1 includes, in addition to the above described components, a control unit 19, a reader 26, motor driver ICs 30, 31, head driver ICs 32, 35, a conveyance motor 33, a carriage motor 34, irradiation apparatus driver ICs 36, 37, a purge driver IC 38, a wipe driver IC 39, and a 3D camera 58. The 3D camera 58 corresponds to a distance detection apparatus.

The control unit 19 has a controller 20 configured with a CPU, storage units (ROM 21, RAM 22, EEPROM 23 (EEPROM is a registered trademark of Renesas Electronics Corporation), HDD 24), and an ASIC 25. The controller 20 is connected to each of the storage units and controls the driver ICs 30, 31, 32, 35, 36, 37, 38, 39 and the display 5.

The controller 20 performs various functions by executing a predetermined processing program stored in the ROM 21. The controller 20 may be implemented in the control unit 19 as a single processor or as multiple processors cooperating with each other. The processing program is read from a computer-readable recording medium KB, such as a magneto-optical disk or a USB flash memory by a reader 26, and is stored in the ROM 21. The RAM 22 stores image data received from outside and results of calculations of the controller 20. The EEPROM 23 stores various initial setting information inputted by the user. The HDD 24 stores specific information, etc.

The ASIC 25 is connected to the motor driver ICs 30, 31, the head driver ICs 32, 35, the irradiation apparatus driver ICs 36, 37, the purge driver IC 38, the wipe driver IC 39, and the 3D camera 58. When the controller 20 receives a printing job from the user, the controller 20 outputs image recording commands to the ASIC 25 based on the processing program. The ASIC 25 drives the driver ICs 30 to 32 and 35 to 39 based on the image recording commands. The controller 20 moves the platen 6 in the conveyance direction Df by driving the conveyance motor 33 via the motor driver IC 30. The controller 20 moves the carriage 3 in the movement direction Ds by driving the carriage motor 34 via the motor driver IC 31.

The controller 20 converts the image data acquired from an external device or the like into ejection data for ejecting the ink droplets onto an ejection target surface of the printing medium W. The controller 20 causes the ejecting head 10 to eject ink droplets by the head driver ICs 32, 35 based on the converted ejection data. The controller 20 also causes the irradiation of ultraviolet rays from each light emitting diode chip of the ultraviolet ray irradiation apparatus 40A, 40B by the irradiation apparatus driver ICs 36, 37. The controller 20 drives the suction pump 52 and the ascending/descending mechanism 53 of the purge unit 50 by the purge driver IC 38. The controller 20 drives the moving mechanism 57 of the wipe unit 54 by the wipe driver IC 39. The 3D camera 58 detects a distance H1 (see FIG. 5) between the ejecting surface NM of the ejecting head 10 and a parallel surface HM of the print medium W, and a distance H2 (see FIG. 5) between the ejecting surface NM and the inclined surfaces KM1, KM2. The controller 20 obtains detection results detected by the 3D camera 58.

Figure 5:
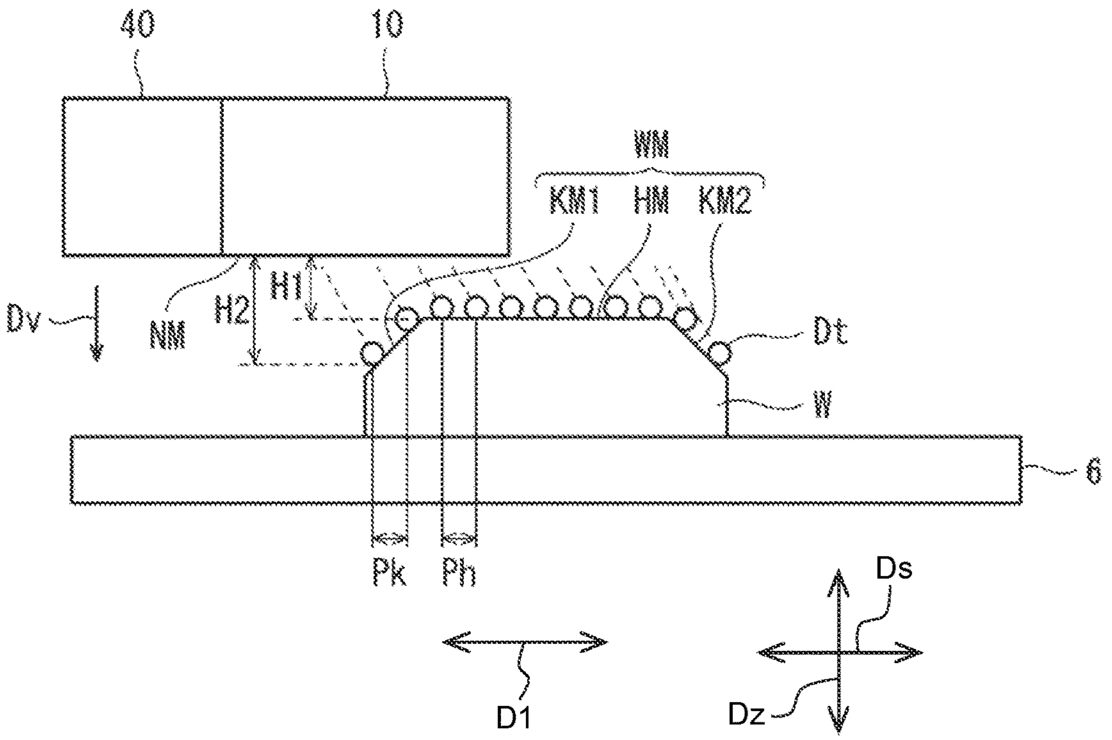
FIG. 5 is a diagram for illustrating conventional problems.

As depicted in FIG. 5, the liquid droplet ejecting apparatus 1*a* can also eject ink droplets Dt onto a printing medium W which is a three-dimensional object. The print medium W has the ejection target surface WM onto which the ink droplets Dt are ejected. The ejection target surface WM includes the parallel surface HM parallel to the ejecting surface NM and the inclined surfaces KM1 and KM2 inclined with respect to the ejecting surface NM. The inclined surface KM1 is located on one side of the parallel surface HM in the first direction D1 parallel to the parallel surface HM. The inclined surface KM2 is disposed on the other side of the parallel surface HM in the first direction D1.

Since the carriage 3 moves in the movement direction Ds when the ejecting head 10 ejects ink droplets Dt, the ink droplets Dt ejected from the ejecting head 10 do not fly along an ejection direction Dv perpendicular to the ejection surface NM but actually fly in a direction inclined with respect to the ejection surface NM. As a result, ink droplets Dt are misplaced. Therefore, it is conceivable to control the operation of the ejecting head 10 so that a pitch Pk between adjacent ink droplets Dt on the inclined surface KM1 and a pitch Ph between adjacent ink droplets Dt on the parallel surface HM are the same when viewed from the ejection direction Dv as depicted in FIG. 5. However, when the printing medium W is viewed from a direction perpendicular to the inclined surface KM1, the image formed on the inclined surface KM1 may appear stretched out. Therefore, the liquid droplet ejecting apparatus 1*a* of the embodiment is provided with a plurality of print modes related to ejection control of the ink droplets Dt for the inclined surfaces KM1 and KM2. The user can select one print mode from the plurality of print modes by using operation keys 4 or the like before starting printing. The print modes include a first print mode, a second print mode, and a third print mode. Each print mode is described below.

Figure 6:
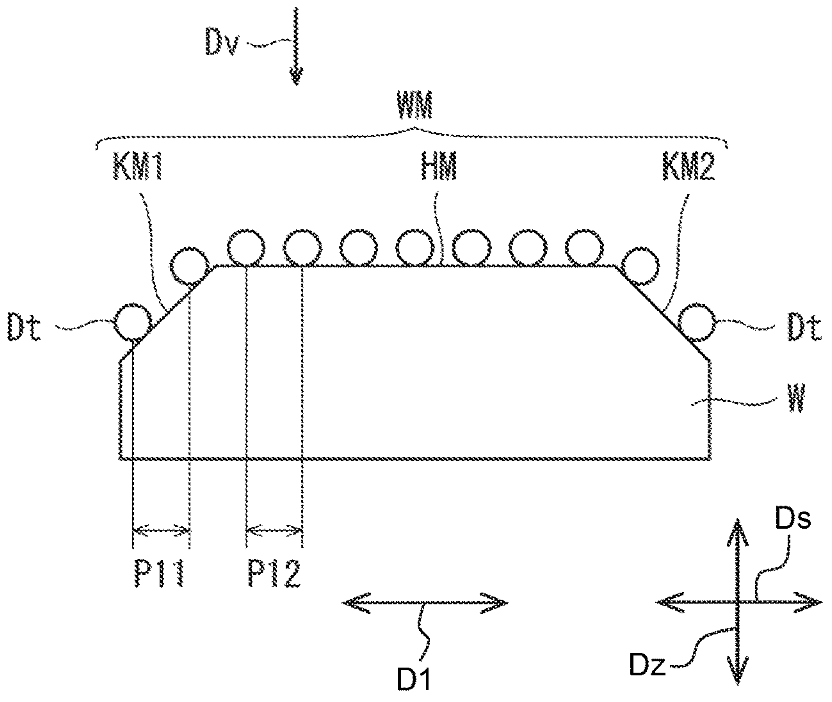
FIG. 6 is a diagram for illustrating a first print mode.

FIG. 6 is a diagram for illustrating the first print mode. In the description of FIG. 6, it is assumed that the first print mode is selected by the user. Before printing based on the first print mode selected by the user is started, the 3D camera 58 detects the distance between the ejecting surface NM of the ejecting head 10 and the parallel surface HM of the printing medium W, and the distance between the ejecting surface NM and the inclined surfaces KM1, KM2 of the printing medium W.

The controller 20 receives the detection result by the 3D camera 58. When the ejection target surface WM, on which the ink droplets Dt are to be ejected, is the inclined surface KM1 or KM2 based on the received detection result, the controller 20 obtains information for the inclined surface KM1 or KM2 relating to the first print mode from RAM 22, and performs ejection control based on the first print mode. The same shall apply to the second and third print modes described below.

The first print mode is a print mode in which the pitch P11 in the first direction D1 parallel to the parallel surface HM between adjacent ink droplets Dt on the inclined surface KM1 or KM2 is the same as the pitch P12 in the first direction D1 between adjacent ink droplets Dt on the parallel surface HM, as depicted in FIG. 6. According to the first print mode, when the printing medium W is viewed from the ejection direction Dv, the image on the inclined surface KM1 or KM2 is prevented or suppressed from appearing distorted or stretched out. This makes the first print mode an effective print mode when the printing medium W is often viewed from a relatively long distance, for example, when the printing medium W is a signboard.

Figure 7:
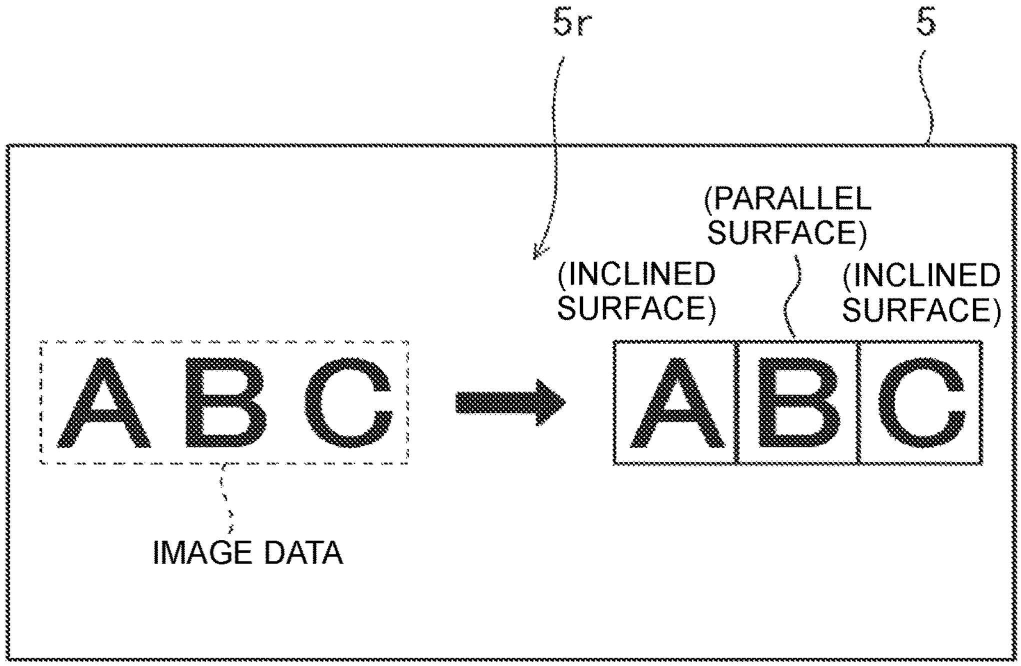
FIG. 7 is a diagram of a review screen indicating a printing pattern on a printing medium based on the first print mode.

As depicted in FIG. 7, after the user selects the first print mode, a review screen 5*r* depicting a printing pattern (mode) on the printing medium W based on the selected first print mode is displayed on the display 5. At this time, the controller 20 outputs image data about the review screen 5*r* to the ASIC 25. For example, assume that the image data is the character "ABC" and that "A" is printed on the inclined surface KM1, "B" is printed on the parallel surface HM, and "C" is printed on the inclined surface KM2. In this case, the user can see the printing patterns on the inclined surface KM1, the parallel surface HM, and the inclined surface KM2 of the printing medium W on the review screen 5*r*. As depicted in FIG. 7, the images on the inclined surfaces KM1 and KM2 do not appear distorted or stretched out. In this way, the user can check the printing pattern on the printing medium W in advance on the review screen 5*r* before the printing is started. The controller 20 outputs the image data after detecting the distance by the 3D camera 58 while moving the carriage 3 in the movement direction Ds. As a result, the review screen 5*r* depicting the printing pattern of the entire printing medium W is displayed on the display 5.

Figure 8:
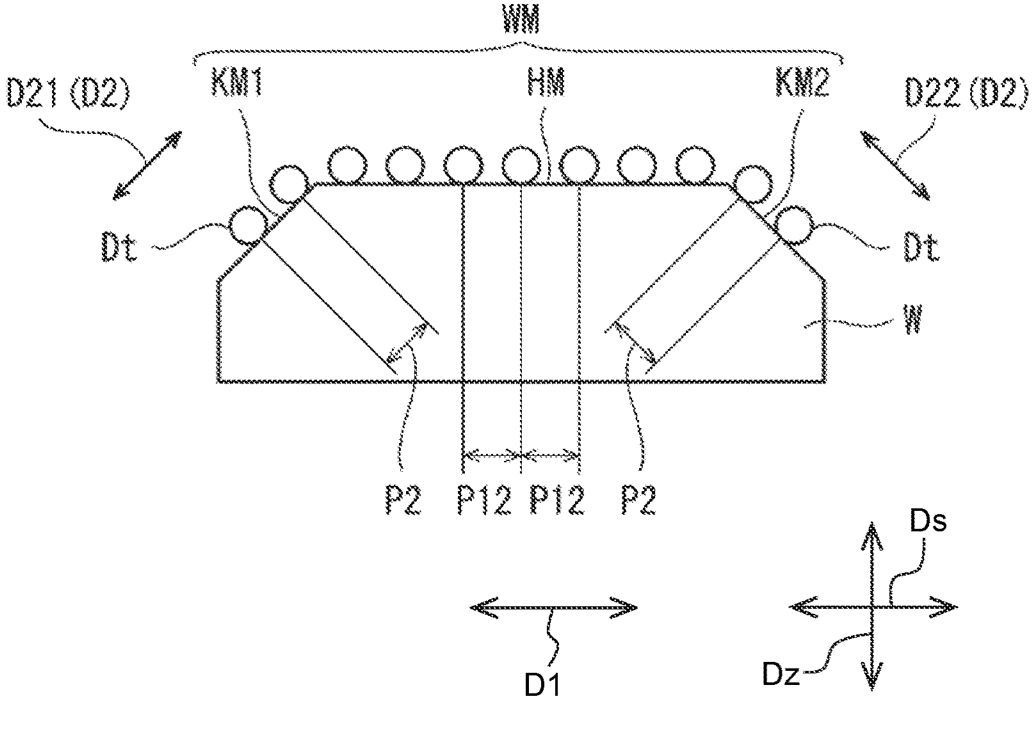
FIG. 8 is a diagram for illustrating a second print mode.

The second print mode is described in the following. FIG. 8 is a diagram for illustrating the second print mode.

The second print mode is a print mode in which a pitch P2 in the second direction D21 parallel to the inclined surface KM1 between adjacent ink droplets Dt on the inclined surface KM1 is the same as the pitch P12 in the first direction D1 between adjacent ink droplets Dt on the parallel surface HM as depicted in FIG. 8. Similarly, the pitch P2 in the second direction D22 parallel to the inclined surface KM2 between adjacent ink droplets Dt on the inclined surface KM2 is the same as the pitch P12 in the first direction D1 between adjacent ink droplets Dt on the parallel surface HM. According to the second print mode, when the printing medium W is viewed from a direction perpendicular to the inclined surface KM1, the image on the inclined surface KM1 is prevented or suppressed from appearing distorted or stretched out. This makes the second print mode an effective print mode when printing on the printing medium W that has relatively many inclined surfaces, such as a mug, for example.

Figure 9A:
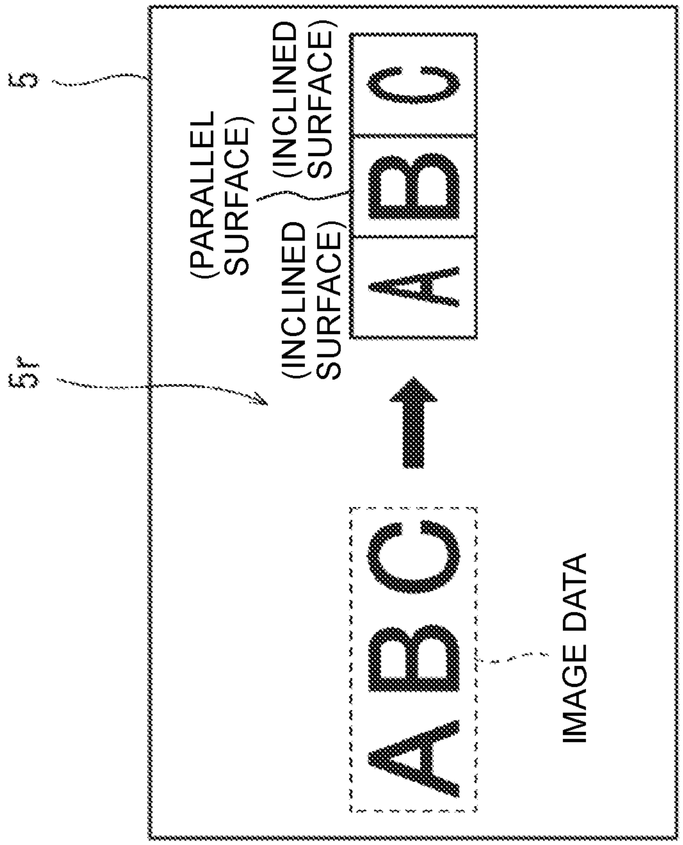
FIG. 9A is a diagram of the review screen when viewing the printing medium from a direction orthogonal to a parallel surface in the second print mode.
Figure 9B:
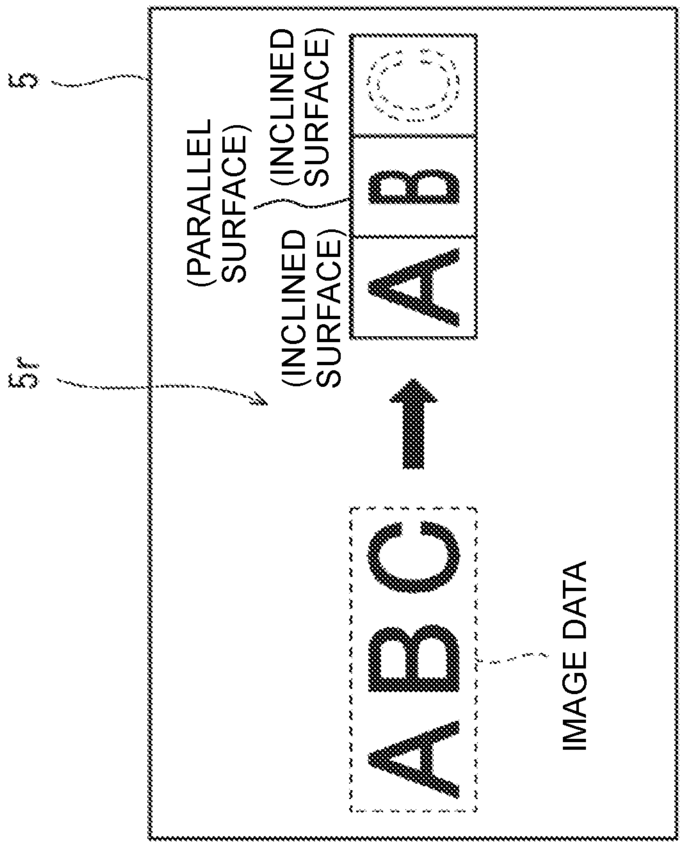
FIG. 9B is a diagram of the review screen when viewing the printing medium from a direction orthogonal to an inclined surface in the second print mode.

As depicted in FIGS. 9A and 9B, after the user selects the second print mode among multiple print modes, a review screen 5*r* depicting the printing pattern on the print media W based on the selected second print mode is displayed on the display 5. In FIGS. 9A and 9B, for example, when the image data is the character "ABC," the user can view the printing pattern on the inclined surface KM1, the parallel surface HM and the inclined surface KM2 of the printing medium W.

The display 5 can display a review screen 5*r* (FIG. 9A) when viewing the printing medium W from a direction perpendicular to the parallel surface HM and a review screen 5*r* (FIG. 9B) when viewing the printing medium W from a direction perpendicular to the inclined surface KM1. As depicted in FIG. 9A, the images on the inclined surfaces KM1 and KM2 appear to shrink when the printing medium W is viewed from a direction perpendicular to the parallel surface HM. On the other hand, as depicted in FIG. 9B, when the printing medium W is viewed from the direction perpendicular to the inclined surface KM1, the image in the parallel surface HM appears to shrink, but the image in the inclined surface KM1 does not appear to shrink. When viewing the print media W from the direction perpendicular to the inclined surface KM1, the image ("C") in the inclined surface KM2 is not visible, so the review screen 5*r* may display the image as a dotted line. The image at the inclined surface KM2 when the printing medium W is viewed from a direction perpendicular to the inclined surface KM2 may be displayed on the review screen 5*r*, and the image at the inclined surface KM1 when the printing medium W is viewed from a direction perpendicular to the inclined surface KM1 may be displayed with the dotted line.

After the user confirms the printing pattern on the review screen 5*r*, a screen that allows the user to input a print resolution of inclined surfaces KM1 and KM2 as needed may be displayed on the display 5. In this case, the controller 20 obtains the resolution input information in which the user inputs the print resolution of the inclined surfaces KM1 and KM2 as needed, and outputs the image data based on the resolution input information to the ASIC 25. The ASIC 25 displays the image data based on the resolution input information on the display 5. This allows the user to check the printing pattern based on the resolution input information inputted by the user as needed, on the display 5.

In the second print mode, the controller 20 controls the operation of the ejecting head 10 to change the printing resolution of the inclined surface KM1 according to an angle formed by the inclined surface KM1 and the discharge surface NM. The following is a specific explanation. The print resolution described below refers to the print resolution when the printing medium W is viewed from a direction perpendicular to the ejecting surface NM.

Figure 10A:
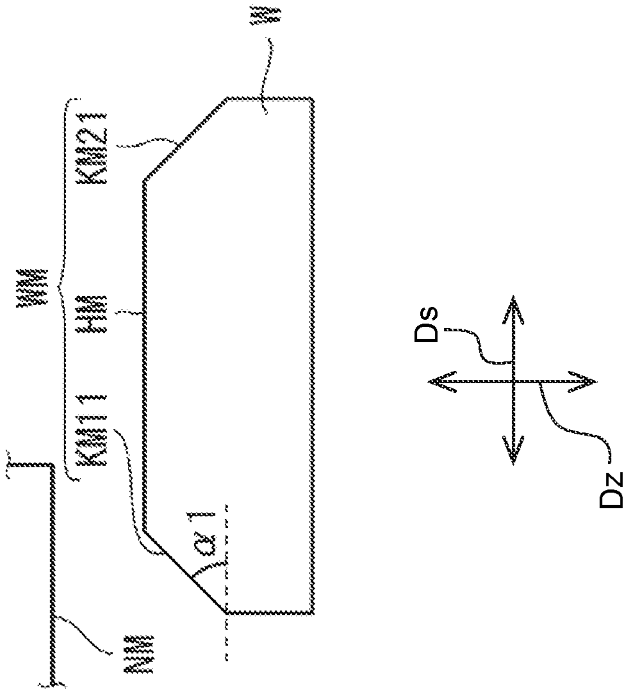
FIG. 10A is a diagram depicting a printing medium having the inclined surface forming a first angle with respect to an ejecting surface.
Figure 10B:
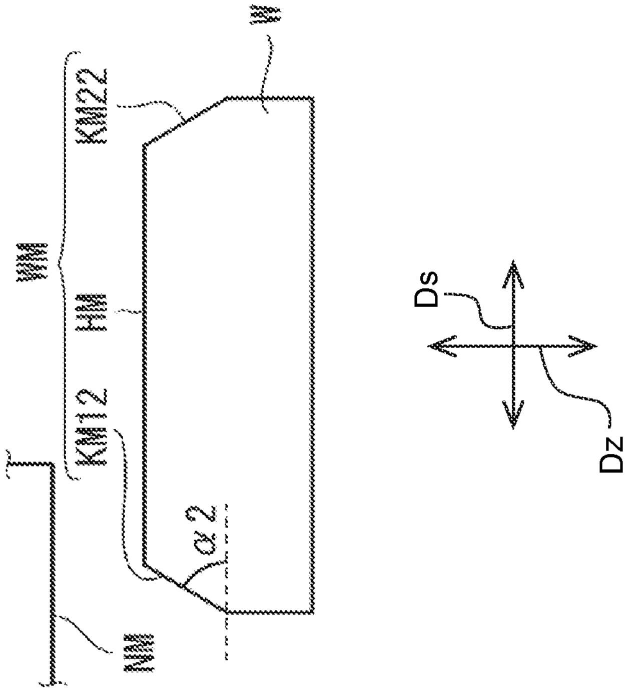
FIG. 10B is a diagram depicting a printing medium having the inclined surface forming a second angle greater than the first angle with respect to the ejecting surface.

The printing medium W depicted in FIG. 10A includes an inclined surface KM11, a parallel surface HM, and an inclined surface KM21. An angle formed by the ejecting surface NM and the inclined surface KM1 is a first angle $\alpha$1. An angle formed by the inclined surface KM21 and the ejecting surface NM is also $\alpha$1. The inclined surface KM11 and the inclined surface KM21 correspond to the first inclined surface. On the other hand, the printing medium W depicted in FIG. 10B includes an inclined surface KM12, a parallel surface HM, and an inclined surface KM22. An angle formed by the inclined surface KM12 and the ejecting surface NM is a second angle $\alpha$2 larger than the first angle $\alpha$1. An angle formed by the inclined surface KM22 and the ejecting surface NM is also $\alpha$2. The inclined surface KM12 and the inclined surface 22 correspond to the second inclined surface.

In the second print mode, the controller 20 controls the operation of the ejecting head 10 so that the printing resolution on the inclined surface KM12 is higher than that of the inclined surface KM11. At this time, the controller 20 reduces moving speed of the carriage 3 when printing on the inclined surface KM12 as compared with when printing on the inclined surface KM11. This allows the printing resolution of the inclined surface KM12 to be higher than that of the inclined surface KM11. Similarly, the controller 20 controls the operation of the ejecting head 10 so that the printing resolution of the inclined surface KM22 is higher than that of the inclined surface KM21 in the second print mode.

Figure 11B:
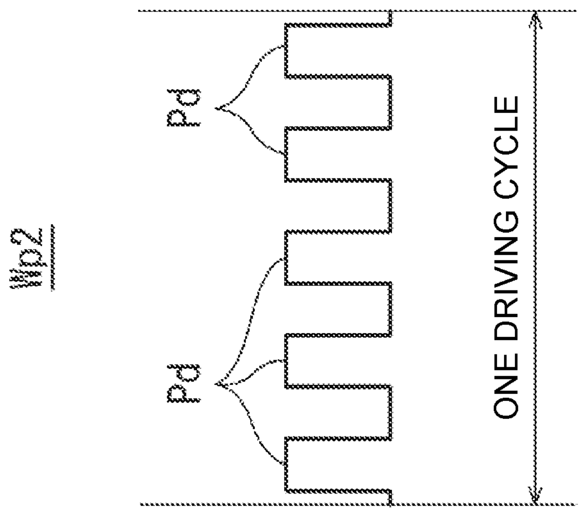
FIG. 11B depicts a driving waveform with five ejecting pulses in the one driving cycle.
Figure 11A:
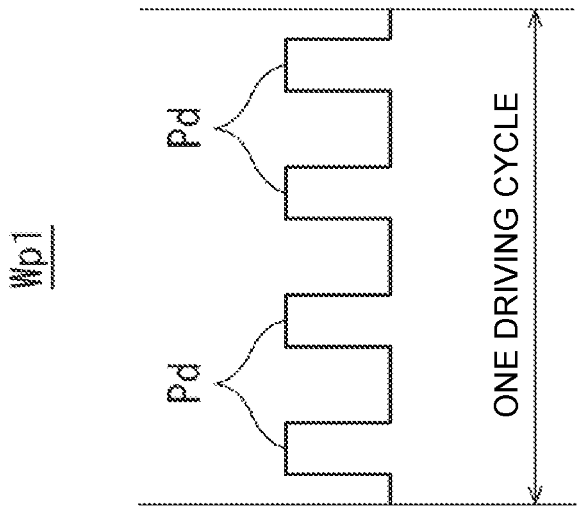
FIG. 11A depicts a driving waveform with four ejecting pulses in one driving cycle.

In the second print mode, when the printing resolution of the inclined surface KM12 is higher than that of the inclined surface KM11, the controller 20 may perform the following control. That is, the controller 20 increases the number of ejecting pulses in one driving cycle in the driving waveform that drives the actuator 160 when printing on the inclined surface KM12, as compared with when printing on the inclined surface KM11. Specifically, when printing on the inclined surface KM11, the controller 20 controls the operation of the ejecting head 10 by using a driving waveform Wp1 in which the number of the ejecting pulses Pd in one driving cycle is, for example, four, as depicted in FIG. 11A. In contrast, when printing on the inclined surface KM12, the controller 20 controls the operation of the ejecting head 10 by using a driving waveform Wp2, which has, for example, five ejecting pulses Pd in the one driving cycle, as depicted in FIG. 11B. This allows the printing resolution of the inclined surface KM12 to be higher than that of the inclined surface KM11. The same control is used to make the printing resolution of the inclined surface KM22 higher than that of the inclined surface KM21.

The controller 20 may determine an upper limit value of the angle $\alpha$1 formed by the inclined surface KM11 and the ejecting surface NM. In this case, the controller 20 may determine the upper limit value based on a ratio between a printing resolution required for the parallel surface HM based on the image data and the highest printing resolution on the parallel surface HM determined based on a movement resolution of the carriage 3. For example, if the angle $\alpha$1 is 75°, the ratio of the length of the inclined surface KM1 to the parallel surface HM is 4, and the printing resolution required for the inclined surface KM1 is 4 times the print resolution of the parallel surface HM. Accordingly, it is difficult to print on the inclined surface KM1 based on the above print resolution. Therefore, the upper limit value of the angle $\alpha$1 formed by the inclined surface KM1 and the ejecting surface NM can be set to 75°, for example.

Next, the third print mode is explained with reference to FIGS. 12 and 13.

Figure 12:
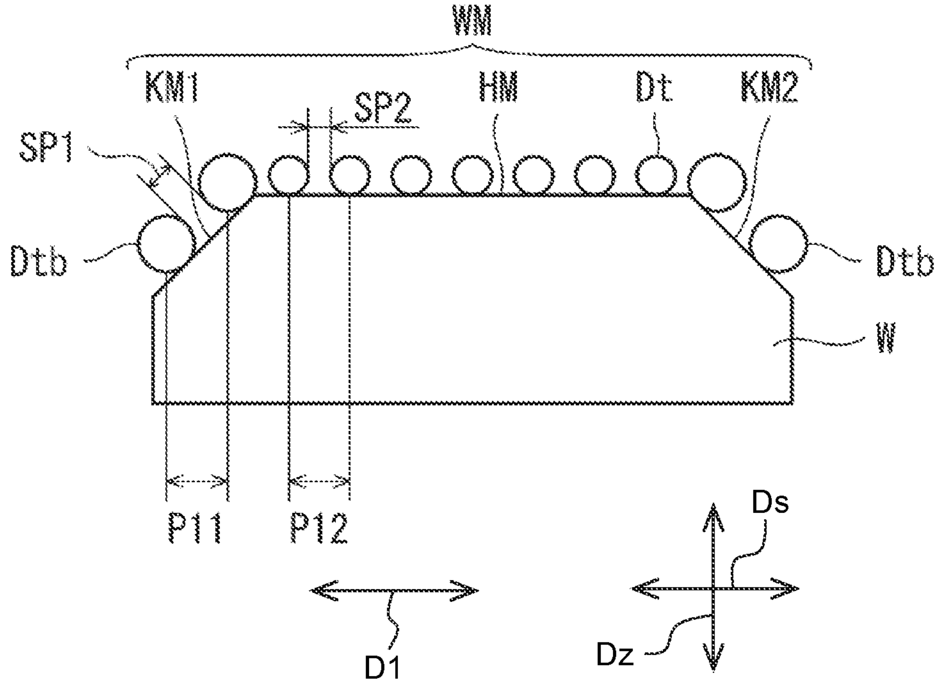
FIG. 12 is a diagram for illustrating an example of a third print mode.
Figure 13:
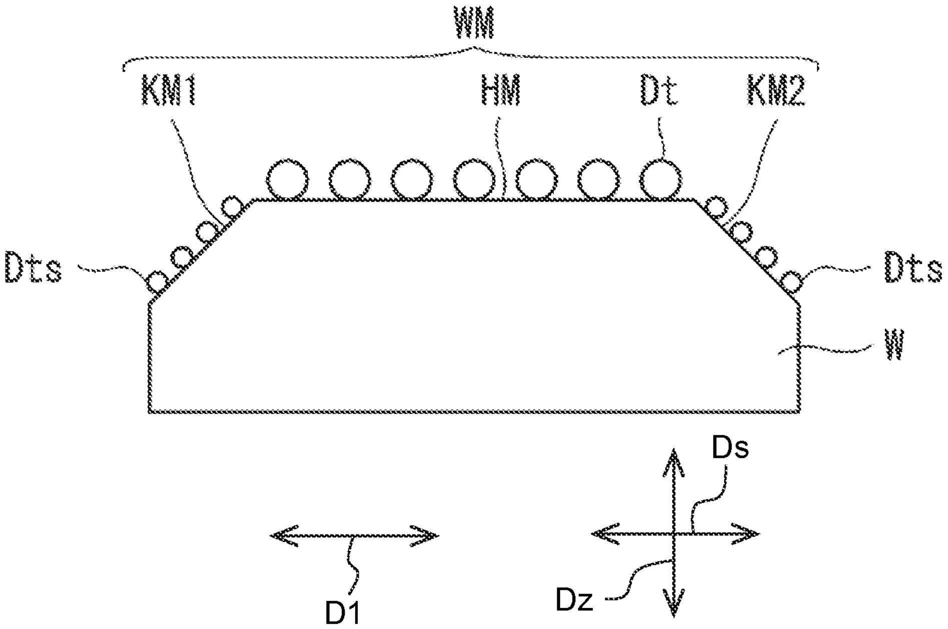
FIG. 13 is a diagram for illustrating another example of the third print mode.

As depicted in FIG. 12, in the third print mode, the operation of the ejecting head 10 is controlled so that volume of each of the ink droplets Dtb to be ejected on the inclined surfaces KM1, KM2 is larger than that of each of the ink droplets Dt to be ejected on the parallel surface HM. As in the first print mode, the pitch P11 in the first direction D1 between adjacent ink droplets Dt on each of the inclined surfaces KM1 and KM2 is the same as the pitch P12 in the first direction D1 between adjacent ink droplets Dt on the parallel surface HM. By ejecting the ink droplets Dtb onto each of the inclined surfaces KM1 and KM2, the spacing distance SP1 between the ink droplets Dtb on each of the inclined surfaces KM1 and KM2 is the same as the spacing distance SP2 between the ink droplets Dt on the parallel surface HM. According to the third print mode, in addition to the effect of the first print mode that the images on the inclined surfaces KM1 and KM2 appear less stretched out when the printing medium W is viewed from the ejecting direction Dv, the same spacing SP1 and SP2 as described above makes difference in shading of the images less noticeable when the printing medium W is viewed from the direction perpendicular to the inclined surfaces KM1 and KM2.

In the third print mode, the controller 20 may perform the following control instead of or in conjunction with the process of ejecting the ink droplets Dtb each having a volume larger than that of each of the ink droplets Dt to be ejected on the parallel surface HM, onto the inclined surfaces KM1 and KM2. That is, as depicted in FIG. 13, the controller 20 may control the operation of the ejecting head 10 so that the number of the ink droplets Dt to be ejected per unit area on each of the inclined surfaces KM1, KM2 is larger than the number of the ink droplets Dt per unit area to be ejected on the parallel surface HM. In this case, a plurality of ink droplets Dts, which are smaller in volume than the ink droplets Dt, may be ejected on the inclined surfaces KM1 and KM2. This process also makes the difference in shading of the images less noticeable when the printing medium W is viewed from directions perpendicular to the inclined surfaces KM1 and KM2. As in the second print mode, in the third print mode, the controller 20 may control the operation of the ejecting head 10 to change the printing resolution of the inclined surfaces KM1, KM2 depending on the angle formed by the inclined surfaces KM1, KM2 and the ejecting surface NM.

Figure 14A:
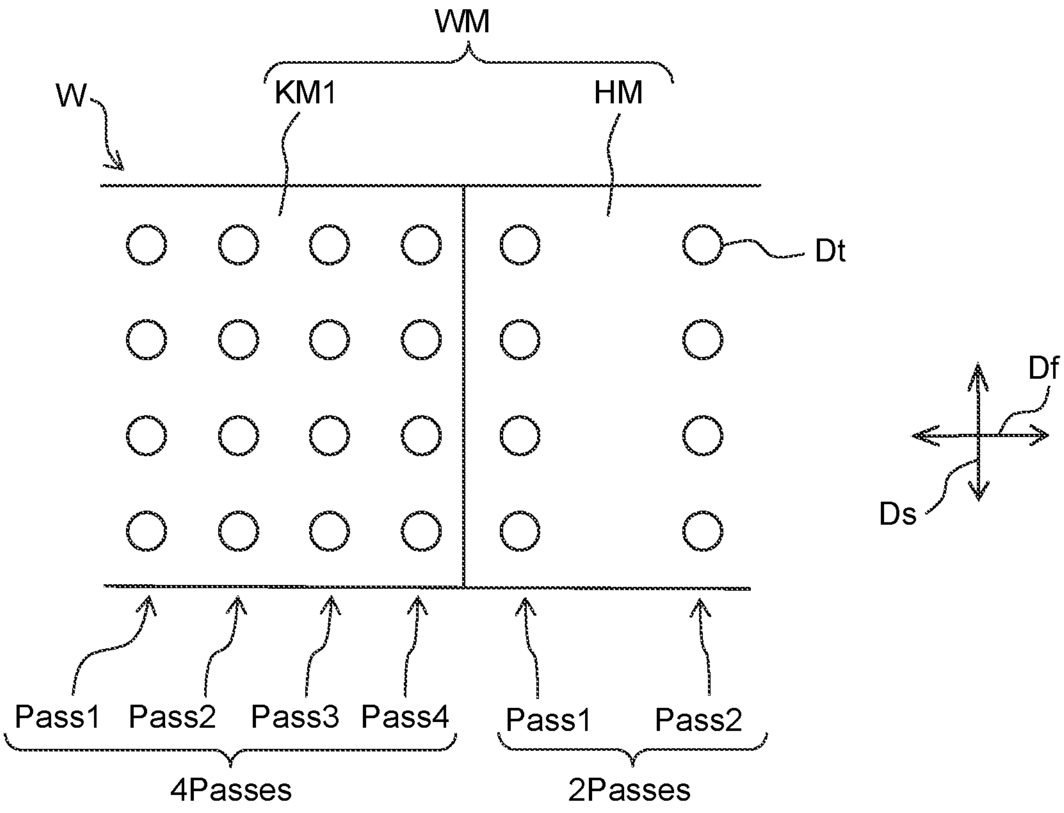
FIG. 14A is a plan view for illustrating ejection control on the inclined and the parallel surfaces aligned in a conveyance direction.
Figure 14B:
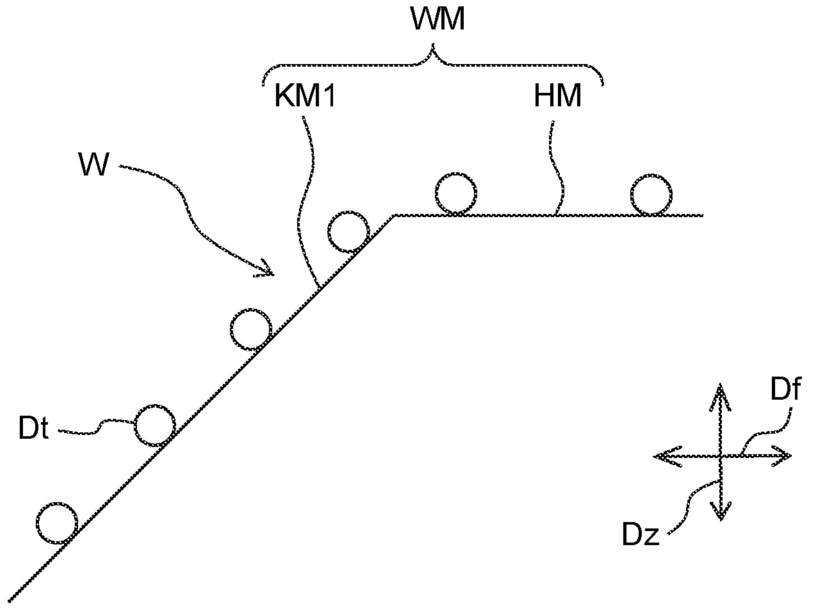
FIG. 14B is a side view of FIG. 14A.

Next, printing medium W with inclined surfaces in the conveyance direction Df can also be printed to increase the printing resolution of the inclined surfaces over that of the parallel surfaces. FIG. 14A is a plan view for illustrating an ejection control on the inclined surface KM1 and the parallel surface HM aligned in conveyance direction Df.

The controller 20 controls the operation of the carriage 3 and the ejecting head 10 so that multiple pass printings are performed on the inclined surface KM1. In detail, the controller 20 controls the movement of the carriage 3 and the ejecting head 10 so that the number of pass printings on the inclined surface KM1 is greater than the number of pass printings on the parallel surface HM. Specifically, as depicted in FIG. 14A, the controller 20 causes the ejecting head 10 to perform, for example, four pass printings on the inclined surface KM11 and two pass printings on the parallel surface HM. In this way, by increasing the number of pass printings on the inclined surface KM1 as compared with the number of pass printings on the parallel surface HM, the print resolution of the inclined surface KM1, which is aligned with the parallel surface HM in the conveyance direction Df, can be higher than the print resolution of the parallel surface HM.

As explained above, according to the liquid droplet ejecting apparatus 1*a*, since the ink droplets Dt are ejected onto the inclined surfaces KM1 and KM2 based on the print mode selected by the user, it is possible to form the images with the desired appearance on the inclined surfaces KM1 and KM2.

In this embodiment, the print modes include the first print mode and the second print mode. In this case, the user can select the first print mode or the second print mode among the print modes based on a main direction in which the printing medium W is viewed. This can suppress the appearance of the images being stretched or shrunk.

In the second print mode, the print resolution of the inclined surfaces KM1, KM2 in the direction perpendicular to the discharge surface NM is changed depending on the angle formed by the inclined surfaces KM1, KM2 and the ejecting surface NM. This allows for an appropriate print resolution according to the angle formed by the inclined KM1, KM2 surfaces and the ejecting surface NM.

In the second print mode, the controller 20 controls the operation of the ejecting head 10 so that the print resolution of the inclined surface KM12 is higher than that of the inclined surface KM11 and the print resolution of the inclined surface KM22 is higher than that of the inclined surface KM21. This allows the print resolution of the inclined surface to be more appropriate as the angle increases.

In this embodiment, when the printing resolution of the inclined surface KM12 is higher than that of the inclined surface KM11 in the second print mode, the controller 20 reduces the moving speed of the carriage 3 as compared with that of printing on the inclined surface KM11. Or, the controller 20 increases the number of ejecting pulses Pd in one driving cycle in the driving waveform Wp2 that drives the actuator 160 in the above case as compared with the driving waveform Wp1 used when printing on the inclined surface KM11. In this case, the printing resolution can be easily increased.

In this embodiment, the third print mode is further included in the print modes. In this case, the distance between adjacent ink droplets Dt on the inclined surfaces KM1, KM2 can be the same as the distance between adjacent ink droplets Dt on the parallel surface HM. This makes it difficult to generate differences in shading depending on the angle from which the printing medium W is viewed. In addition, by ejecting ink droplets Dtb with a large volume, the printing time can be shorter than when a large number of ink droplets Dt are ejected.

In the third print mode, the controller 20 may perform the following control instead of or in conjunction with the process of ejecting ink droplets Dtb, of a larger volume than the volume of ink droplets Dt to be ejected on the parallel surface HM, onto the inclined surfaces KM1, KM2. That is, the controller 20 may control the operation of the ejecting head 10 so that the number of ink droplets Dt to be ejected per unit area on the inclined surfaces KM1, KM2 is greater than the number of ink droplets Dt to be ejected per unit area on the parallel surface HM. In this case, by ejecting a larger number of ink droplets Dt, the image can be formed more beautifully and finely than when ejecting the liquid droplets Dtb with larger volume.

In the third print mode, the controller 20 controls the operation of the ejecting head 10 so that the volume of ink droplets Dt or the number of ink droplets Dt to be ejected on the inclined surfaces KM1, KM2 changes depending on the angle formed by the inclined surfaces KM1, KM2 and the ejecting surface NM. In this case, an appropriate image can be formed in which the shading difference is hardly generated depending on the angle formed by the inclined surfaces KM1, KM2 and the ejecting surface NM.

In this embodiment, the controller 20 may control the operation of the ejecting head 10 so that the volume of ink droplets Dt to be ejected increases as the angle of the inclined surfaces KM1, KM2 to the ejecting surface NM increases, in the third print mode. Alternatively, the controller 20 may control the operation of the ejecting head 10 so that the number of ink droplets Dt to be ejected increases as the angle of the inclined surfaces KM1, KM2 to the ejecting surface NM increases, in the third print mode. Generally, the larger the inclined angle of the inclined surface, the fewer the number of the liquid droplets landed on the inclined surface, and hence the lower the placement density of the ink droplet Dt on the inclined surface. In contrast, in this embodiment, as the above angle increases, the ink droplets Dt with larger volume or more ink droplets Dt are ejected, thus preventing a decrease in the placement density of ink droplets Dt on the inclined surfaces KM1 and KM2.

In this embodiment, when the inclined surface KM1 and parallel surface HM of the printing medium W are provided along the conveyance direction Df, the control apparatus 20 controls the operation of the carriage 3 and the ejecting head 10 to perform multiple pass printings on the inclined surface KM1. This allows the image to be formed on the inclined surface KM1 in the manner desired by the user even when printing on a printing medium W with an inclined surface KM1 in the conveyance direction Df.

In this embodiment, the controller 20 controls the movement of the carriage 3 and the ejecting head 10 so that the number of the pass printings on the inclined surface KM1 is greater than that on the parallel surface HM. This prevents the image from being stretched when the inclined surface KM1 is viewed from the direction perpendicular to the inclined surface KM1.

In this embodiment, the review screen 5*r* indicating the printing pattern is displayed on the display 5 before the printing is started. In this case, the user can check in advance the printing pattern on the printing medium W on the review screen 5*r* before the printing is started.

In this embodiment, the controller 20 outputs the image data after detecting the distances H1 and H2 by the 3D camera 58 while moving the carriage 3 in the movement direction Ds. In this case, the review screen 5*r* indicating the printing pattern of the entire printing medium W can be displayed.

In addition, the user can input any print resolution for the inclined surfaces KM1, KM2. This allows the user to manually correct the print resolution if there is a problem with the printing pattern as a result of checking the review screen 5*r*.

Furthermore, in this embodiment, the controller 20 determines the upper limit value of the angle α1 formed by the inclined surface KM11 and the ejecting surface NM. In this case, the printing can be executed while knowing in advance the limit value of the above angle α1 capable of achieving the desired print resolution.

The present teaching is not limited to the embodiment described above, and various variations are possible without departing from the gist of the present teaching.

In the above embodiment, the distance H1 between the ejecting surface NM and the parallel surface HM and the distance H2 between the ejecting surface NM and the inclined surfaces KM1, KM2 are detected by the 3D camera 58. However, for example, the user may input the distances H1 and H2, store the input information in the storage units, and the controller 20 may obtain the stored information. Alternatively, the distances may be detected by a 3D scanner or other distance detection apparatus.

The printing medium W of the above embodiment had only two inclined surfaces KM1, KM2, but the number of the inclined surfaces may be one, or three or more.

Furthermore, in the above embodiment, an ink droplet with a smaller volume than ink droplet Dt may be placed between one ink droplet Dtb and the other ink droplet Dtb ejected on the inclined surface KM1.

What is claimed is:

1. A liquid droplet ejecting apparatus, comprising:

an ejecting head having an ejecting surface, the ejecting head being configured to eject liquid droplets onto a print target based on image data, the print target including a parallel surface parallel to the ejecting surface and an inclined surface inclined with respect to the ejecting surface;

a distance detector configured to detect a distance between the ejecting surface and the parallel surface and a distance between the ejecting surface and the inclined surface; and a controller, wherein if the controller determines that the liquid droplets are to be ejected onto the inclined surface based on a detection result of the distance detector, the controller is configured to:

obtain information about a print mode selected by a user from a plurality of print modes related to ejection control of the liquid droplets to the inclined surface; and execute an ejection control of the liquid droplets for the inclined surface based on the print mode selected by the user.

2. The liquid droplet ejecting apparatus according to claim 1, wherein the print modes include a first print mode and a second print mode, a first direction is along the parallel surface, a second direction is along the inclined surface, in the first print mode, a pitch in the first direction between two adjacent liquid droplets on the inclined surface is same as a pitch in the first direction between two adjacent liquid droplets on the parallel surface, and in the second print mode, a pitch in the second direction between the two adjacent liquid droplets on the inclined surface is same as the pitch in the first direction between the two adjacent liquid droplets on the parallel surface.

3. The liquid droplet ejecting apparatus according to claim 2, wherein in the second print mode, the controller is configured to control the ejecting head to change a print resolution on the inclined surface in a direction orthogonal to the ejecting surface, depending on an angle formed by the inclined surface and the ejecting surface.

4. The liquid droplet ejecting apparatus according to claim 3, wherein the inclined surface includes a first inclined surface and a second inclined surface, the ejecting surface and the first inclined surface form a first angle, the ejecting surface and the second inclined surface form a second angle larger than the first angle, in the second print mode, the controller is configured to control the ejecting head such that the print resolution on the second inclined surface is higher than the print resolution on the first inclined surface.

5. The liquid droplet ejecting apparatus according to claim 4, further comprising a carriage configured to carry the ejecting head and move in a movement direction, wherein in the second mode, the controller is configured to make a moving speed of the carriage on the second inclined surface slower than a moving speed of the carriage on the first inclined surface, such that the print resolution on the second inclined surface is higher than the print resolution on the first inclined surface.

6. The liquid droplet ejecting apparatus according to claim 4, wherein the ejecting head includes: a nozzle configured to eject the liquid droplets onto the print target; and an actuator configured to apply pressure to liquid in a pressure chamber communicating with the nozzle, and in the second mode, the controller is configured to make a number of ejecting pulses, for the second inclined surface, included in one driving cycle of a driving wave form for driving the actuator larger than a number of ejecting pulses, for the first inclined surface, included in the one driving cycle, such that the print resolution on the second inclined surface is higher than the print resolution on the first inclined surface.

7. The liquid droplet ejecting apparatus according to claim 1, wherein the print modes include a third print mode in which the controller is configured to control the ejecting head such that volume of each of the liquid droplets to be ejected onto the inclined surface is larger than volume of each of the liquid droplets to be ejected onto the parallel surface.

8. The liquid droplet ejecting apparatus according to claim 7, wherein in the third print mode, the controller is configured to control the ejecting head such that a number of the liquid droplets to be ejected per unit area on the inclined surface is larger than a number of the liquid droplets to be ejected per unit area on the parallel surface, instead of making the volume of each of the liquid droplets to be ejected onto the inclined surface larger than the volume of each of the liquid droplets to be ejected onto the parallel surface.

9. The liquid droplet ejecting apparatus according to claim 7, wherein in the third print mode, the controller is configured to control the ejecting head such that a number of the liquid droplets to be ejected per unit area on the inclined surface is larger than a number of the liquid droplets to be ejected per unit area on the parallel surface, while making the volume of each of the liquid droplets to be ejected onto the inclined surface larger than the volume of each of the liquid droplets to be ejected onto the parallel surface.

10. The liquid droplet ejecting apparatus according to claim 7, wherein in the third print mode, the controller is configured to control the ejecting head to change the volume of each of the liquid droplets to be ejected onto the inclined surface depending on an angle formed by the inclined surface and the ejecting surface.

11. The liquid droplet ejecting apparatus according to claim 10, wherein the inclined surface includes a first inclined surface and a second inclined surface, the ejecting surface and the first inclined surface form a first angle, the ejecting surface and the second inclined surface form a second angle larger than the first angle, in the third print mode, the controller is configured to control the ejecting head such that volume of each of the liquid droplets to be ejected onto the second inclined surface is larger than volume of each of the liquid droplets to be ejected onto the first inclined surface.

12. The liquid droplet ejecting apparatus according to claim 7, wherein in the third print mode, the controller is configured to control the ejecting head to change a number of the liquid droplets to be ejected onto the inclined surface depending on an angle formed by the inclined surface and the ejecting surface.

13. The liquid droplet ejecting apparatus according to claim 12, wherein the inclined surface includes a first inclined surface and a second inclined surface, the ejecting surface and the first inclined surface form a first angle, the ejecting surface and the second inclined surface form a second angle larger than the first angle, in the third print mode, the controller is configured to control the ejecting head such that a number of the liquid droplets to be ejected onto the second inclined surface is larger than a number of the liquid droplets to be ejected onto the first inclined surface.

14. The liquid droplet ejecting apparatus according to claim 1, further comprising:

a carriage configured to carry the ejecting head and move in a movement direction; and a conveying unit configured to convey the print target in a conveyance direction, wherein the inclined surface and the parallel surface are arranged along the conveyance direction, and the controller is configured to control the carriage and the ejecting head to perform a plurality of pass printings on the inclined surface.

15. The liquid droplet ejecting apparatus according to claim 14, wherein the controller is configured to control the carriage and the ejecting head such that a number of the pass printings on the inclined surface is larger than a number of the pass printings on the parallel surface.

16. The liquid droplet ejecting apparatus according to claim 1, wherein after any one of the print modes are selected by the user, the controller is configured to output image data about a review screen indicating the one of the print modes on the print target.

17. The liquid droplet ejecting apparatus according to claim 16, further comprising a carriage configured to carry the ejecting head and move in a movement direction, wherein the controller is configured to output the image data after detecting the distance by the distance detector while moving the carriage in the movement direction.

18. The liquid droplet ejecting apparatus according to claim 16, wherein the controller is configured to obtain resolution input information about a print resolution on the inclined surface in a direction orthogonal to the ejecting surface inputted by the user.

19. The liquid droplet ejecting apparatus according to claim 1, further comprising a carriage configured to carry the ejecting head and move in a movement direction, wherein the controller is configured to determine an upper limit of an angle formed by the inclined surface and the ejecting surface in a case of ejecting the liquid droplets onto the inclined surface, by using a ratio between a print resolution required for the parallel surface based on the image data and a highest print resolution on the parallel surface determined based on a movement resolution of the carriage.

* * * * *